United States Patent [19]

Viennot

[11] 4,281,943

[45] Aug. 4, 1981

[54] METHOD AND DEVICE FOR ANCHORING RODS OF INSULATING MATERIAL IN ATTACHMENT FITTING

[76] Inventor: Pierre Viennot, 32, rue des Garrements, 92140 Clamart, France

[21] Appl. No.: 154,014

[22] Filed: May 28, 1980

[30] Foreign Application Priority Data

Jun. 15, 1979 [FR] France ................................ 79 15432

[51] Int. Cl.[3] ......................... F16B 11/00; F16B 13/04

[52] U.S. Cl. .................................... 403/267; 156/153; 156/221; 156/267; 156/286; 156/293; 156/294; 156/330; 264/102; 264/262; 264/263; 264/274; 403/266; 403/268

[58] Field of Search ............... 156/153, 286, 293, 294, 156/221, 267, 330; 264/261, 262, 263, 274, 102; 403/248, 265, 267, 268, 280, 281, 290, 374, 362, 266

[56] References Cited

U.S. PATENT DOCUMENTS

| | | | |
|---|---|---|---|
| 1,565,611 | 12/1925 | Ade | 403/248 |
| 2,255,184 | 9/1941 | Osenberg | 264/262 |
| 2,874,937 | 2/1959 | Higgins | 156/294 |
| 2,935,551 | 5/1960 | Wells | 403/280 |
| 2,967,738 | 1/1961 | Moore | 403/267 |
| 3,090,653 | 5/1963 | Stump | 403/267 |
| 3,092,217 | 6/1963 | Alloggio | 403/374 |
| 3,303,262 | 2/1967 | Turner | 264/262 |
| 3,328,229 | 6/1967 | Windecker | 156/293 |
| 3,506,520 | 4/1970 | Norcross | 156/293 |
| 3,572,785 | 3/1971 | Larson | 403/374 |
| 3,660,887 | 5/1972 | Davis | 264/262 |
| 3,765,975 | 10/1973 | Hollingsworth | 264/102 |
| 3,779,296 | 12/1973 | Echeverria | 403/267 |

FOREIGN PATENT DOCUMENTS

| | | | |
|---|---|---|---|
| 2828375 | 12/1979 | Fed. Rep. of Germany . | |
| 2836851 | 3/1980 | Fed. Rep. of Germany . | |
| 9653 | 4/1892 | U.S.S.R. | 403/267 |

*Primary Examiner*—Jerome W. Massie
*Attorney, Agent, or Firm*—Berman, Aisenberg & Platt

[57] ABSTRACT

A method and device for anchoring rods of high tensile strength insulating material in metal attachment fittings are disclosed. The end of the rod which is previously split and traversed by a hole is inserted axially into the attachment fitting through an open end thereof. A fastening member is inserted into a blind hole extending across an internal cavity in the attachment fitting in line with the hole in the rod for spreading the rod end, the split end being brought into engagement with large wall portions of the inwardly flaring internal cavity of the attachment filling. A relatively high vacuum is applied to the internal cavity. The internal cavity is filled with a high strength, nonshrinking resin having a coefficient of expansion identical to that of the metal fitting through a channel in the fastening member. After polymerization the resin hardens on the rod to form a rigid block fast with the attachment fitting which prevents the rod from being pulled out of the attachment fitting. The protruding end of the fastening member is then severed level with the exterior of the attachment fitting.

9 Claims, 3 Drawing Figures

METHOD AND DEVICE FOR ANCHORING RODS OF INSULATING MATERIAL IN ATTACHMENT FITTING

FIELD OF THE INVENTION

The present invention relates to a method and device for fixing rods of insulating material in attachment fittings.

BACKGROUND OF THE INVENTION

According to the prior art technique for fixing an insulating rod to an attachment fitting anchoring is usually accomplished by force fitting.

The resulting connection is very often unsatisfactory particularly because of the nature of the components to be associated, namely, a rod of insulating material and a metal attachment fitting.

More recently such connections have been attempted by bonding, the rod of insulating material being coated with a layer of bonding material or adhesive, but such attempts have been unsuccessful by reason of the formation of bubbles, thereby resulting in unsatisfactory anchoring which is unacceptable for industrial use.

Thus, U.S. Pat. No. 3,672,712 discloses a structure for connecting an attachment to the end of a fiberglass element. The end of the fiberglass element to be fixed to the attachment is divided into four equal segments. According to this patent a central opening is provided to facilitate the potting of the segments in resin.

German Pat. No. 1,074,688 discloses the fixing of a ceramic casing or envelop of an insulator to a core made of a plurality of fiberglass reinforced rods by means of a filler material (adhesive).

Swiss Pat. No. 571,267 discloses a method of anchoring the end of a rod of fibered reinforced synthetic resin in a fitting. According to this method the end of the rod is heated until weakening of the synthetic resin-fiber covering connection, enlarging in all directions and anchoring by filling the slots with synthetic resin which hardens.

French certificate of addition application U.S. Pat. No. 76 12787, publication No. 2,249,934, discloses a manner of connecting an anchoring fitting to a rod. A particular bonding method is used in which the bonding substance is introduced through hole which are then sealed off by stoppers.

German Pat. No. 1,259,531 discloses an insulator comprising a ceramic envelop or casing and a core or rod of fiberglass reinforced synthetic resin. The space between the core and the casing is filled with a liquid or pasty (bonding substance) medium. A locking member is applied against the rod to prevent it from turning.

Summary of the Invention

An object of the invention is to overcome the foregoing drawbacks and to permit the fixing of an insulator rod in an attachment fitting which is reliable, efficient, of high strength and durable.

When carrying out the invention all the problems inherent in the prior art are overcome, namely, the formation of bubbles, owing to the provision of a step during which a vacuum is applied to the interior of the attachment fitting adapted to receive the insulator rod.

The method according to the invention is of very simple and economical construction.

In accordance with the invention there is provided a method of fixing rods in a metal attachment fitting, in which the insulating rod has a segmented end traversed by a hole, the attachment fitting having an inwardly flaring internal cavity and a blind hole extending across the cavity, and a fastening member having a channel therethrough and a frustoconical tip and being adapted to be received in the blind hole; said method comprising the steps of: inserting the segmented end of the rod into the internal cavity of the attachment fitting; inserting the fastening member into the blind hole in the attachment fitting and through the hole traversing the rod end, the frustoconical tip of the fastening member spreading the rod segments apart and into contact along large wall portions of the internal cavity of the attachment fitting; applying a vacuum to the internal cavity; filling the cavity with a resin through the channel in the fastening member, the resin being of high strength and non shrinking (and having a coefficient of expansion identical to that of the metal of the attachment fitting); permitting the resin to polymerize which thereby forms a rigid block with the rod fast with the attachment fitting, the undercut of the internal cavity of the attachment fitting preventing extraction of the rod even against the application of high traction forces; and after polymerization of the resin, severing the end of the fastening member flush with the attachment fitting.

Preferably, the hole in the insulator rod is in line with the axis and continuation of the blind hole in the attachment fitting.

Preferably, the fastening member is positioned in the blind hole in the attachment fitting by continuous pressure or repeated impacts.

The filling of the internal cavity of the attachment fitting is carried out by suction under vacuum then by injecting a resin, the resin being an epoxy or any similar suitable bonding substance.

Preferably the rod of insulating material and the attachment fitting are mechanically machined before fixing the rod of insulating material in the attachment fitting.

According to another aspect of the invention, a device for anchoring rod of high tensile strength insulating material having a segmented end traversed by a hole comprises a metal attachment fitting having an open-ended inwardly flaring internal cavity, a blind hole extending across said internal cavity, a fastening member sized and shaped to be inserted into said blind hole through said hole traversing said rod end, said fastening member having a frustoconical tip defining means for spreading the segments of the segmented end of said rod into contact with large wall portions of said internal cavity, said fastening member having channel means adapted to be connected at one end to a source of resin for filling said internal cavity and adapted to communicate through its other end with said internal cavity when said fastening member is received in said blind hole for feeding the resin into said internal cavity.

Various advantages and features of the present invention will be brought out in the detailed description hereinbelow.

BRIEF DESCRIPTION OF THE DRAWINGS

The invention is illustrated by way of a nonlimiting example in the accompanying drawings, in which.

Figure 1:
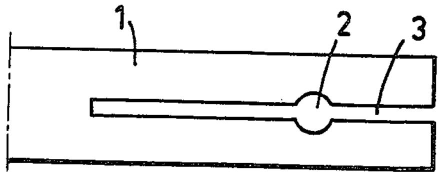
FIG. 1 is a top view of a rod of insulating material, namely an insulator rod, having a split or segmented end traversed by a hole.

In the accompanying drawings, particularly FIG. 1, there is illustrated in top view part of an insulator part having a split or segmented end formed by a longitudinal slot 3 and traversed by a hole 2 having a diameter of the order of 6 mm. The rod 1 is made of high tensile strength insulating material such as glass filaments and epoxy resin.

Figure 2:
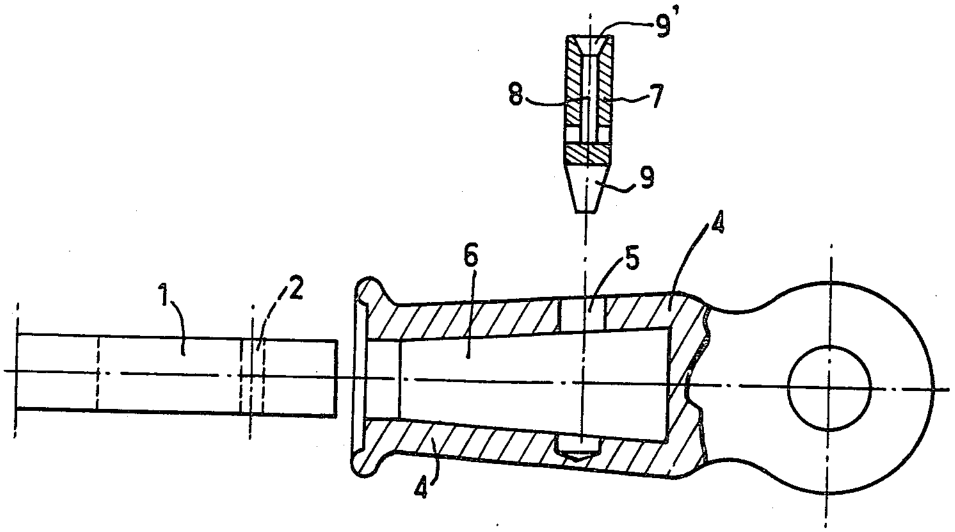
FIG. 2 is an exploded view in cross-section of the anchoring device including the insulating rod, the attachment fitting and the fastening member before assembly.

FIG. 2 shows in an exploded view partly in cross-section, the three main components parts of the anchoring device of the invention. The rod 1 having hole 2 and slot 3 is inserted along the axis of the metal attachment fitting 4. The attachment fitting has a blind hole 5 extending across an internal cavity 6 into one wall portion of the attachmemt fitting. The diameter of the blind hole 5 may be, for example, about 10 mm. The internal cavity 6 of the attachment fitting is of frustoconical configuration and flares inwardly from the open end of the attachment fitting to define a substantial undercut.

The method of fixing the insulating rod 1 in the attachment fitting is carried out as follows.

The rod 1 is inserted into the attachment fitting 4 through the open end thereof, the hole traversing the end of the rod 1 is brought in line with the axis and continuous of the blind hole 5 in the attachment fitting 4. Then the fastening member 7 is placed in the blind hole 5 in the attachment fitting 4 and by means of continuous pressure or repeated impacts the frustoconical tip 9 of the fastening member spreads the segmented end of the rod 1, the segments coming into engagement with large wall portions of the inwardly flaring internal cavity 6 of the attachment fitting 4. Once the insulating rod 1 is in position in the internal cavity 6 of the attachment fitting 4, the internal cavity 6 is filled by suction under vacuum then injection of resin through channel 8 in the fastening member, the resin being, for example, of high strength, nonshrinking and having a coefficient of expansion identical to that of the metal of the attachment fitting. After polymerization of the resin, the resin forms with the rod 1 a rigid block fast with the attachment fitting 4 whose undercut defined by the internal cavity prevents the extraction of the rod 1 even upon application of high traction forces. After polymerization the fastening member 7 is severed level with the outer surface of the attachment fitting 4.

According to the present invention the filling of the internal cavity of the attachment fitting involves, first of all, applying a relatively high vacuum by any suitable means, not shown, and well known to those skilled in the art. Then, after application of the relatively high vacuum a suitable resin is injected into the internal cavity 6 of the attachment fitting 4 through the channel 8 in the fastening member 7. As a result no bubbles detrimental to the fixing of the insulating rod in the attachment fitting are formed and therefore the connection is very rigid and reliable.

Figure 3:
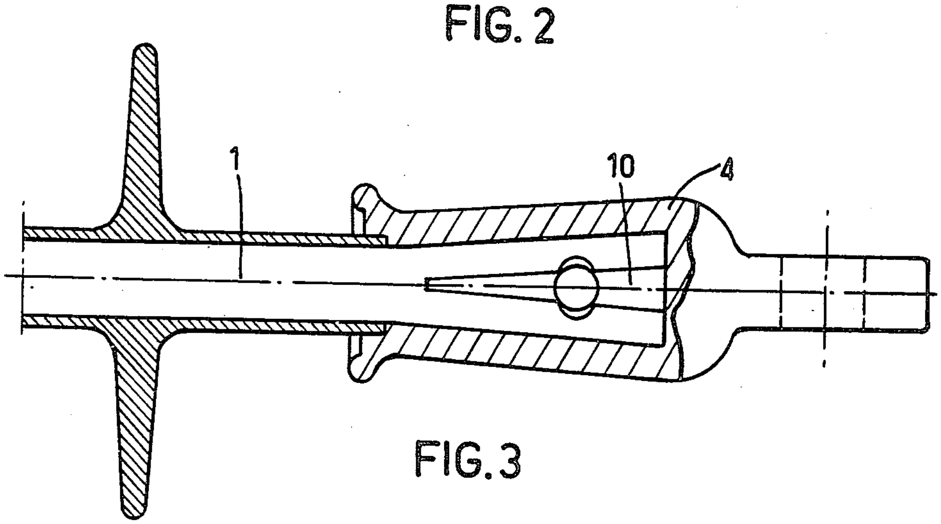
FIG. 3 is a side elevational view of the assembled anchoring device embodying the present invention.

FIG. 3 shows the assembled components of the anchoring device and the connection obtained in accordance with the method described above. This figure illustrates particularly well the fixing of the rod 1 in the attachment fitting 4 and the generally inwardly flaring wedge of polymerized resin 10 formed between the segments of the end of the rod.

It will be observed that the device for anchoring the insulating rod is of very simple and economical design and the components are simply a rod 1 of high tensile strength insulating material, for example, a material of glass filaments and epoxy resin, a metal attachment fitting having an inwardly flaring internal cavity defining a large undercut and a metal fastening member 7. To improve the quality of the connection the components are mechanically machined before assembly.

The method and device according to the present invention have a particular application in the anchoring of insulator rods; nonetheless it is possible to envisage other applications.

The invention is not limited to the illustrated and described embodiment, for various modifications may be resorted to without departing from the spirit and scope of the invention defined by the appended claims.

What is claimed is:

1. A method of fixing an insulting rod in a metal attachment fitting, in which the insulating rod has a segmented end traversed by a hole, the attachment fitting having an inwardly flaring internal cavity and a blind hole extending across the cavity, and a fastening member having a channel therethrough and a frustoconical tip and being adapted to be received in the blind hole; said method comprising the steps of:

(a) inserting the segmented end of the rod into the internal cavity of the attachment fitting;

(b) inserting the fastening member into the blind hole in the attachment fitting and through the hole traversing the rod end, the frustoconical tip of the fastening member spreading the rod segments apart and into contact along large wall portions of the internal cavity of the attachment fitting;

(c) applying a vacuum to the internal cavity;

(d) filling the cavity with a resin through the channel in the fastening member, the resin being of high strength, nonshrinking and having a coefficient of expansion identical to that of the metal of the attachment fitting;

(e) permitting the resin to polymerize which thereby forms a rigid block with the rod fast with the attachment fitting, the undercut of the internal cavity of the attachment fitting preventing extraction of the rod even against the application of the high traction forces; and (f) after polymerization of the resin, severing the end of the fastening member flush with the attachment fitting.

2. A method according to claim 1, wherein in step (b) the fastening member is inserted into the hole traversing the rod end along the axis of the blind hole in the attachment fitting.

3. A method according to claim 1 or 2, further comprising applying continuous pressure to the fastening member in step (b) to bring it into the desired position in the blind hole.

4. A method according to claims 1 or 2 further comprising applying repeated impacts to the fastening member in step (b) to bring it into the desired position in the blind hole.

5. A method according to claim 1, wherein the filling of the cavity includes injecting the resin.

6. A method according to claim 1, said resin being an epoxy resin.

7. A method according to claim 1, said resin being a bonding resin.

8. A method according to claim 1, further comprising mechanically machining the insulating rod and the attachment fitting before commencing step (a).

9. A device for anchoring rod of high tensile strength insulating material having a segmented end traversed by a hole, comprising a metal attachment fitting having an open-ended inwardly flaring internal cavity, a blind hole extending across said internal cavity, a fastening member sized and shaped to be inserted into said blind hole through said hole traversing said rod end, said fastening member having a frustoconical tip defining means for spreading the segments of the segmented end of said rod into contact with large wall portions of said internal cavity, said fastening member having channel means adapted to be connected at one end to a source of resin for filling said internal cavity and adapted to communicate through its other end with said internal cavity when said fastening member is received in said blind hole for feeding the resin into said internal cavity.

* * * * *